United States Patent
Dong et al.

(10) Patent No.: US 8,462,783 B2
(45) Date of Patent: Jun. 11, 2013

(54) METHOD AND A NODE DEVICE FOR TRANSFERRING A MESSAGE BASED ON TRAFFIC ENGINEERING TUNNELS

(75) Inventors: Weisi Dong, Guangdong Province (CN); Gang Cheng, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 11/631,916

(22) PCT Filed: Jul. 19, 2006

(86) PCT No.: PCT/CN2006/001749
§ 371 (c)(1),
(2), (4) Date: Sep. 23, 2008

(87) PCT Pub. No.: WO2007/019769
PCT Pub. Date: Feb. 22, 2007

(65) Prior Publication Data
US 2009/0041032 A1   Feb. 12, 2009

(30) Foreign Application Priority Data
Aug. 12, 2005   (CN) .......................... 2005 1 0091248

(51) Int. Cl.
*H04B 3/20* (2006.01)
(52) U.S. Cl.
USPC ........... 370/392; 370/389; 370/397; 370/399; 370/401; 370/408
(58) Field of Classification Search
None
See application file for complete search history.

(56) References Cited

U.S. PATENT DOCUMENTS

| 7,046,669 | B1 | 5/2006 | Mauger et al. |
| 7,319,699 | B1 * | 1/2008 | Provine et al. ............. 370/395.3 |
| 2003/0118036 | A1 | 6/2003 | Gibson et al. |
| 2003/0137983 | A1 | 7/2003 | Song |
| 2004/0028064 | A1 | 2/2004 | Cetin et al. |

(Continued)

FOREIGN PATENT DOCUMENTS

| CN | 1486052 A | 3/2004 |
| CN | 1507230 | 6/2004 |
| CN | 1848804 A | 10/2006 |
| CN | 101160914 A | 4/2008 |

OTHER PUBLICATIONS

International Search Report from International Patent Application PCT/CN2006/001749.

(Continued)

*Primary Examiner* — Jae Y Lee
(74) *Attorney, Agent, or Firm* — Slater & Matsil, LLP

(57) ABSTRACT

Embodiments of the present invention provide a method and a node device for transferring a message based on MPLS TE tunnels. The main principle of the embodiments is to determine a switching node at which MPLS TE tunnel switching is needed, and to set routing and forwarding information for tunnel switching between different MPLS TE tunnels at the switching node. The switching node switches and transfers message into different MPLS TE tunnels according to the routing and forwarding information. The present invention makes the sum of the whole network edge bandwidth resources much higher than that of the bandwidth resource at the network core, allows the network resources to converge layer by layer, and avoids the N-square problem of the tunnel number effectively and lightens the load on the network core nodes by the large number of tunnels and the load of RSVP-TE state refreshing.

4 Claims, 1 Drawing Sheet

U.S. PATENT DOCUMENTS

| | | | | |
|---|---|---|---|---|
| 2004/0202171 | A1* | 10/2004 | Hama | 370/395.1 |
| 2005/0262264 | A1* | 11/2005 | Ando et al. | 709/233 |
| 2006/0133265 | A1* | 6/2006 | Lee | 370/228 |
| 2006/0215672 | A1* | 9/2006 | Lawrence et al. | 370/401 |
| 2006/0262735 | A1* | 11/2006 | Guichard et al. | 370/254 |

OTHER PUBLICATIONS

Modern wired transmission, No. 2, Jun. 2001, Yi Zhun, Wan Hongshen, Ding Tieqi, "MPLS and Traffic Engineering in Internet", see p. 50-54.

European Search Report dated Jun. 20, 2008 from European Patent Application No. 06761484.

E. Rosen and Y. Rekhter; Cisco Systems, Inc. "BGP/MPLS VPNs." Mar. 1999, pp. 1-26.

Rosen, E., et al., "BGP/MPLS VPNs", Network Working Group, Request for Comments (RFC) 2547, Mar. 1999, 23 pages.

Awduche, D., et al., "Requirements for Traffic Engineering Over MPLS", Network Working Group, Request for Comments (RFC) 2702, Sep. 1999, 26 pages.

Nanjing University of Posts and Telecommunications, Fiber Communication Research Institute, Jiangsu, Nanjing, 210003, China, "MPLS and Traffic Engineering in Internet", Communication Technology, 2001, 10 pages, vol. 2001, 17 (4).

Bates, T., et al., "BGP Route Reflection: An Alternative to Full Mesh Internal BGP (IBGP)", Network Working Group, Request for Comments (RFC) 4456, Apr. 2006, 11 pages.

English Translation of the Written Opinion of the International Searching Authority, PCT/CN2006/001749, Nov. 9, 2006, 5 pages.

Chinese Office Action with Partial English Translation, Chinese Application No. 200510091248.4, mailing date Mar. 2, 2007, 6 pages.

Chinese Office Action with Partial English Translation, Chinese Application No. 200510091248.4, mailing date Aug. 24, 2007, 7 pages.

Communication pursuant to Article 94(3) EPC, Applicant Huawei Technologies Co., Ltd., Application No. 06 761 484.2-1249, May 25, 2009, 4 pages.

Chinese Office Action with Partial English Translation, Chinese Application No. 200680012218.2, mailing date Dec. 4, 2009, 15 pages.

Communication pursuant to Article 94(3) EPC, Applicant Huawei Technologies Co., Ltd., Application No. 06 761 484.2-1249, Mar. 15, 2010, 4 pages.

Communication pursuant to Article 94(3) EPC, Application No. 06 761 484.2-1249, Applicant Huawei Technologies Co., Ltd., dated Dec. 19, 2011, 4 pages.

* cited by examiner

METHOD AND A NODE DEVICE FOR TRANSFERRING A MESSAGE BASED ON TRAFFIC ENGINEERING TUNNELS

FIELD OF THE PRESENT INVENTION

The present invention relates to the field of Traffic Engineering technologies, in particular, to a method and a node device for transferring a message based on Multi-Protocol Label Switching Traffic Engineering (MPLS TE) tunnels.

BACKGROUND OF THE PRESENT INVENTION

MPLS TE technology collects link bandwidth information of the whole network via extended Interior Gateway Protocol (IGP), and calculates an end-to-end tunnel connection complying with several constraint conditions by Constrained Shortest Path First (CSPF) algorithm; for example, by designating bandwidth information, MPLS TE technology may calculate an end-to-end tunnel which meets the bandwidth requirement and the type of service (TOS) requirement, and perform bandwidth resource reservation at the nodes along the tunnel. In case of resource shortage, MPLS TE can preempt bandwidth resource of low-priority LSP tunnels, thus to meet the requirements of LSPs which need much bandwidth or of important users. Meanwhile, the Fast Re-Route (FRR) technology based on MPLS TE can provide protection by FRR link or node protection when an LSP tunnel fails or congestion occurs on a certain node in the network, thus achieving a disturbance switching in less than 50 ms.

It can be seen from the above description that MPLS TE technology is a true end-to-end Quality of Service (QOS) solution. MPLS TE technology has become an important solution for QOS and reliability problems and the like in IP technology, and it is being deployed widely.

At present, MPLS TE technology is deployed end to end, for example, an MPLS TE tunnel is deployed between any two PEs (Provider Edge devices) in a network. MPLS TE technology may be combined with Multi-Protocol Label Switching Virtual Private Network (MPLS VPN), etc., so as to achieve higher QOS and reliability guarantee.

When MPLS TE technology is combined with MPLS VPN, etc., an MPLS TE tunnel serves as an outer layer tunnel of MPLS VPN, and the MPLS TE tunnel is not a tunnel established by IGP, but a Label Switched Path (LSP) tunnel established by Label Distribution Protocol (LDP).

SUMMARY OF THE PRESENT INVENTION

Embodiments of the present invention provide a method and a node device for transferring a message based on MPLS TE tunnels. In the embodiments, layer-by-layer network resource convergence may be achieved by allowing the MPLS TE tunnels tunnel switching ability.

An embodiment of the present invention provides a method for transferring a message based on Multi-Protocol Label Switching Traffic Engineering tunnels, the method including:

determining a switching node at which Multi-Protocol Label Switching Traffic Engineering tunnel switching is needed;

setting routing and forwarding information at the switching node for tunnel switching between different Multi-Protocol Label Switching Traffic Engineering tunnels; and switching and transferring by the switching node the message in the different Multi-Protocol Label Switching Traffic Engineering tunnels according to the routing and forwarding information.

An embodiment of the present invention further provides a node device, which includes:

a routing and forwarding information storage module, for storing routing and forwarding information for tunnel switching between different Multi-Protocol Label Switching Traffic Engineering tunnels; and a message forwarding module, for switching and transferring a message in the different Multi-Protocol Label Switching Traffic Engineering tunnels according to the routing and forwarding information stored in the routing and forwarding information storage module.

DETAILED DESCRIPTION OF THE EMBODIMENTS

End-to-end MPLS TE tunnels have an end-to-end tunneling functionality, without tunnel switching ability. Therefore, network deployment of end-to-end MPLS TE tunnels is a monolayer deployment. If MPLS TE tunnels can perform tunnel switching, a layered deployment of MPLS TE tunnels may be realized and the layer-by-layer convergence of the bandwidth resource in the whole network may be obtained.

Therefore, the main principle of the embodiments of the present invention is to determine a switching node at which MPLS TE tunnel switching is needed, and to set routing and forwarding information for tunnel switching between different MPLS TE tunnels at the switching node. The switching node switches and transfers messages via different MPLS TE tunnels according to the routing and forwarding information.

When a node is both a start node of an end-to-end MPLS TE tunnel, and an end node of another end-to-end MPLS TE tunnel, the node is referred to as a switching node for the switching between different MPLS TE tunnels. For achieving the hierarchy of a network, in the embodiments of the present invention, the network may be partitioned into multiple area networks based on the layering requirement of the network.

A layered network has at least two layers; for example, a network may be partitioned into Access Network and Core Network. In the embodiments of the present invention, when a network is partitioned into Access Network and Core Network, the area networks have two types accordingly, i.e., Access Network Area and Core Network Area. There may be a plurality of Access Network Areas and one Core Network Area.

In the embodiments of the present invention, there are deployed intra-area network end-to-end MPLS TE tunnels in each area network; for example, end-to-end MPLS TE tunnels between nodes within Core Network Area may be disposed in a Core Network Area, and end-to-end MPLS TE tunnels between nodes within Access Network Area may be disposed in each Access Network Area.

MPLS TE tunnels within each area network are in fully-mesh state. End-to-end QOS guarantee and TE FRR reliability protection may be provided for every MPLS TE tunnel in each area network. Because the number of nodes in each area network is not very large, there will be no N-square problem of MPLS TE tunnel number and low network bandwidth resource utility.

End-to-end MPLS TE tunnels belonging to different area networks respectively have tunnel switching ability. The switching ability is implemented by a node related to the end-to-end MPLS TE tunnels in different area networks respectively. In the embodiments of the present invention, such a node is referred to as Tnode (Transit node, switching node), which is introduced to realize MPLS TE tunnel switching.

Figure 1:
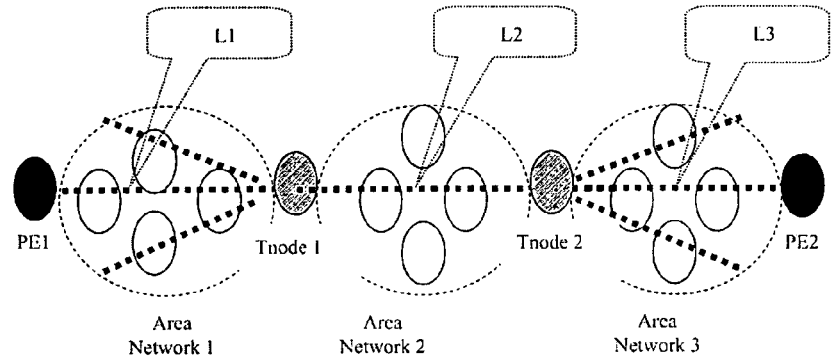
FIG. 1 shows a schematic architecture diagram of the MPLS TE tunnel switching according to an embodiment of the present invention.

The MPLS TE tunnel switching architecture according to an embodiment of the present invention is shown in FIG. 1.

Referring to FIG. 1, the whole network is partitioned into multiple area networks. Area network 1 and area network 3 are Access Network Areas, and area network 2 is a Core Network Area. In each area network, there are disposed End-to-end MPLS TE tunnels between the nodes in the area network, as shown by bold dotted line in FIG. 1. Although multiple nodes are disposed in the whole network, only nodes Tnode 1 and Tnode 2 are shown in FIG. 1 for exemplary purpose.

In the above architecture, no end-to-end MPLS TE tunnel is disposed between a PE in Area 1 and a PE in Area 3. For example, there is no end-to-end MPLS TE tunnel disposed between PE1 and PE2. MPLS TE tunnels are disposed between the nodes within each area network. The MPLS TE tunnels in each area network may be disposed to be mesh like. Thus, a PE in Area 1 and a PE in Area 3 may be connected via multiple MPLS TE tunnels in Area 1, Area 2, and Area 3 to achieve the effect of an end-to-end MPLS TE tunnel. For example, PE1 and PE2 may be connected via Tunnel L1 between PE1 and Tnode1, Tunnel L2 between Tnode1 and Tnode2, and Tunnel L3 between Tnode2 and PE2, so as to achieve the effect of an end-to-end MPLS TE tunnel between PE1 and PE2.

In particular, a tunnel switching between an end-to-end MPLS TE tunnel in area network 1 and an end-to-end MPLS TE tunnel in area network 2 is performed via Tnode1, such that message may be transmitted from the end-to-end MPLS TE tunnel in area network 1 to Tnode2. Then, a tunnel switching between the end-to-end MPLS TE tunnel in area network 2 and an end-to-end MPLS TE tunnel in area network 3 is performed via Tnode2. Thus, Tnode1 and Tnode2 function as the switching nodes for tunnel switching. However, not only Tunnel L1, but also other MPLS TE tunnels in area network 1 may have a tunnel switching with Tunnel L2 in area network 2 via Tnode1.

Therefore, the Tunnel L2 in area network 2 is a switching tunnel in a higher hierarchy, in other words, in comparison with area network 1 and area network 3, area network 2 is an area network in a higher hierarchy. The tunnels in area network 2 are also tunnels in higher hierarchy. Tunnel L2 provide a tunnel switching channel for the MPLS TE tunnels in area network 1 and those in area network 3. Area network 2 may be regarded as an MPLS TE tunnel switching Area, and area network 1 and area network 3 may be regarded as MPLS TE Tunnel Access Areas. As a result, in the embodiments of the present invention, by making MPLS TE tunnels have tunnel switching ability, a flat network deployed with MPLS TE tunnels may be transformed into a layered network.

MPLS TE tunnel itself only provides simple tunneling function, but cannot provide tunnel switching function and cannot implement tunnel switching between several MPLS TE tunnels, so the tunnel switching needs to be realized depending on other control planes.

The technical solutions of the embodiments of the present invention will now be illustrated by an example of a method for transferring a message based on MPLS TE tunnels in an MPLS VPN application.

MPLS VPN applications include MPLS L3VPN, MPLS L2VPN and so on, such as Pseudo Wire Emulation Edge-to-Edge (PWE3) and Virtual Private LAN Service (VPLS). A tunnel connecting with two PEs is needed in all the above applications. For QOS guarantee and high reliability, MPLS TE tunnels are desirable tunnels for these VPN applications.

It can be seen from the above description of MPLS TE tunnel switching architecture that the MPLS TE tunnel switching according to the embodiments of the present invention has to be realized depending on other control planes. Routing and forwarding information for tunnel switching is set in the switching nodes for the tunnel switching between different MPLS TE tunnels by a control plane. For example, routing and forwarding information is set in Tnode1 and Tnode2, as shown in FIG. 1. In MPLS VPN applications, it is realized by means of the control plane signaling of MPLS VPN, such as BGP.

In MPLS VPN applications, Border Gateway Protocol (BGP) is widely used as control signaling for carrying MPLS VPN routing information. The next hop in MPLS VPN routing information may be used to select an MPLS TE tunnel, the principle of which is as follows:

A Tnode is selected in the MPLS VPN network, and a BGP route reflector is configured in the Tnode. The BGP route reflector in the Tnode may modify the next hop in a received BGP-based routing message and change the next hop information in the routing message to the corresponding Tnode address. Because a Tnode may also function as a routing reflection point for other normal control procedures at the same time, the Tnode may be identified according to the VPN information in the control information carried via BGP.

After the next hop contained in the BGP-based routing message is changed, the label information contained in the routing message will also be replaced by new MPLS TE tunnel label information and VPN label information. Moreover, the BGP in the Tnode may distribute the routing message containing the new next hop information and the new label information to other Tnodes or PEs. After other Tnodes receive the routing message, they may perform a similar operation as required.

After the distribution of the above routing message, there is stored routing and forwarding information for MPLS TE tunnel switching in the Tnode. After receiving a message from a tunnel, the Tnode matches the MPLS TE tunnel label information and VPN label information contained in the message with the record in its stored routing and forwarding information, performs label switching according to the out-label in the matching record, then transfers the message in a corresponding MPLS TE tunnel according to the out-interface and the next hop node in the matching record.

Figure 2:
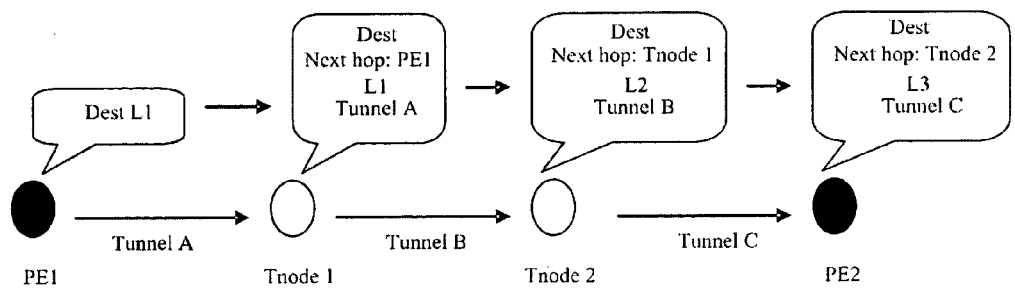
FIG. 2 shows a control flowchart of the MPLS VPN employing the MPLS TE tunnel switching according to an embodiment of the present invention.

FIG. 2 shows the control process of MPLS TE tunnel switching according to an embodiment of the present invention. The control process of MPLS TE tunnel switching is a process for setting routing and forwarding information in a Tnode.

In FIG. 2, the VPN label in the routing message distributed by PE1 is referred to as L1, which is represented by "Dest L1" (Destination Address L1) in the drawing. The routing message is distributed to Tnode1 via Tunnel A. Tnode1 updates the VPN label in the routing and forwarding information of Tunnel A to L1 according to the VPN label L1 in the routing message, updates the next hop node in the routing and forwarding information of Tunnel A to PE1, and changes the VPN label in the routing message to L2, changes the MPLS TE tunnel label in the routing message to Tunnel B, changes the next hop in the routing message to Tnode1, and then distributes the routing message.

The routing message distributed by Tnode1 is distributed to Tnode2 via Tunnel B. Tnode2 updates the VPN label of the out-label in the routing and forwarding information of Tunnel B to L2 according to the VPN label L2 in the routing message, updates the next hop no de in the routing and forwarding information of Tunnel B to Tnode1, and changes the VPN label, the MPLS TE tunnel label and the next hop in the routing message to L3, Tunnel C and Tnode2 respectively, and distributes the routing message.

The routing message distributed by Tnode2 is distributed to PE2 via Tunnel C. PE2 terminates the routing message.

As an example, the destination address Dest of the PE1, the Tnode1, the Tnode2 and the PE2 in this embodiment is illustrated in FIG. 2 respectively.

Figure 3:
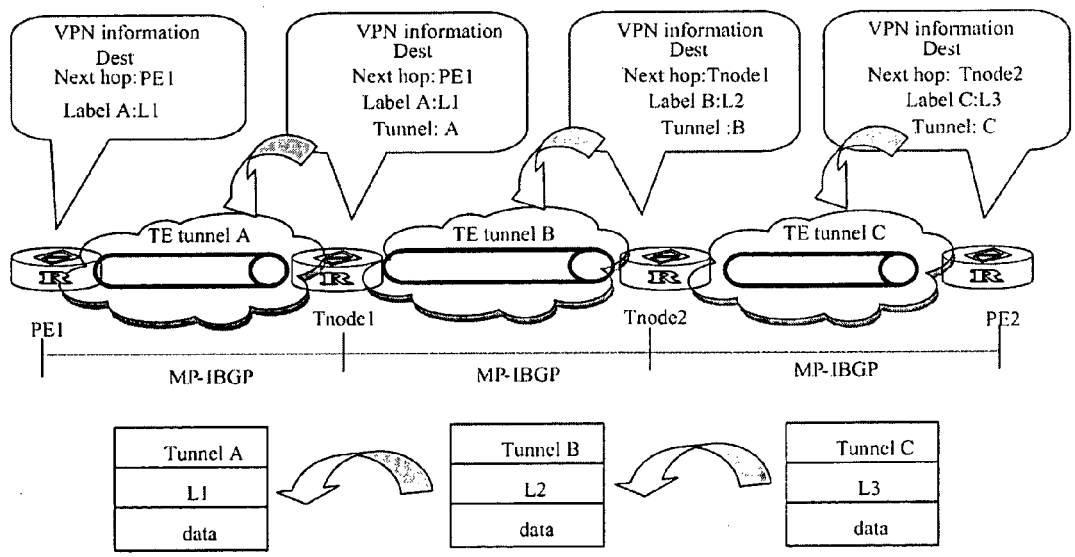
FIG. 3 shows a forwarding flowchart of the MPLS VPN employing the MPLS TE tunnel switching according to an embodiment of the present invention.

The transferring process of the message after the above distribution of the routing message is as shown in FIG. 3.

In FIG. 3, PE2 is required to transfer a loaded message. PE2 sets the MPLS TE tunnel label, the VPN label and the next hop node of the message as Tunnel C, L3 and Tnode2 respectively according to the VPN label in the message, and then transfers the message to Tnode2 via Tunnel C according to the MPLS TE tunnel label, the VPN label and the next hop node. Tnode2 changes the MPLS TE tunnel label, the VPN label and the next hop node in the message to Tunnel B, L2 and Tnode1 respectively, and then transfers the message to Tnode1 via Tunnel B. Tnode1 changes the MPLS TE tunnel label, the VPN label and the next hop node in the message to Tunnel A, L1 and PE1 respectively, and then transfers the message to PE1 via Tunnel A.

Thus, the TE tunnels selected on PE2, Tnode1 and Tnode2 will be MPLS TE tunnels within the local area network and will not be end-to-end tunnels between PEs of different area networks.

The node device according to an embodiment of the present invention includes a message forwarding module, a routing and forwarding information storage module and a routing and forwarding information updating module.

The routing and forwarding information storage module is mainly for storing routing and forwarding information for the tunnel switching between different MPLS TE tunnels. The routing and forwarding information is set by the routing and forwarding information updating module. The routing and forwarding information stored in the routing and forwarding information storage module includes next hop node, in-label, out-label and out-interface, etc.

The message forwarding module is mainly for switching and transferring a message in different MPLS TE tunnels according to the routing and forwarding information stored in the routing and forwarding information storage module. The method for switching and transferring a message in different MPLS TE tunnels by the message forwarding module is as described in the above method.

The routing and forwarding information updating module is mainly for updating the routing and forwarding information stored in the routing and forwarding information storage module according to a received routing message, and updating the information in the routing message accordingly, and then distributing and transferring the updated routing message. The routing and forwarding information updating module implements the control process of MPLS TE tunnel switching, the detail of which is as described in the above method.

Although the embodiments of the present invention have been described, it is understood for those skilled in the art that various variations and modifications may be made without departing from the spirit and the scope of the present invention as defined by the appended claims and their equivalents.

It can be seen from the above that the embodiments of the present invention allow the MPLS TE tunnels a tunnel switching ability by setting the routing and forwarding information for MPLS TE tunnel switching at the switching nodes where MPLS TE tunnel switching is needed; by disposing the end-to-end MPLS TE tunnels in each area network and making the MPLS TE tunnels in each area network have tunnel switching ability, make the sum of the whole network edge bandwidth resources much higher than the bandwidth resource at the network core, allow the network resources to converge layer by layer, and reduce the whole network bandwidth resource consumption of the end-to-end MPLS TE tunnels with constant bandwidth resource; make the whole network tunnel number, especially the tunnel number at the network core, not take an N-square increase as the increase of the network node number, so as to avoid the N-square problem of the tunnel number effectively and lighten the load on the network core nodes by the large number of tunnels and the load of RSVP-TE state refreshing; by configuring a Border Gateway Protocol-based route reflector in the switching node, enable the route reflector to modify the next hop node, the in-label and the out-label, etc. in the routing message and to distribute and transfer the routing message; in case the original BGP protocol is slightly modified, simplify the setting process of the routing and forwarding information for MPLS TE tunnel switching, and enhance the BGP protocol. Therefore, according to the embodiments of the present invention, the requirement of layer-by-layer network resource convergence can be met, and the bandwidth resource utility and the network extensibility can be improved.

What is claimed is:

1. A method for transferring a message based on Multi-Protocol Label Switching Traffic Engineering (MPLS TE) tunnels, the method comprising:

partitioning a network into multiple area networks according to network hierarchy, and setting end-to-end Multi-Protocol Label Switching Traffic Engineering tunnels between the nodes within each area network, wherein the end-to-end Multi-Protocol Label Switching Traffic Engineering tunnels within each area network are in a fully-mesh state;

determining a switching node at which tunnel switching between the end-to-end Multi-Protocol Label Switching Traffic Engineering tunnels within different area networks is needed, wherein end-to-end Multi-Protocol Label Switching Traffic Engineering tunnels belonging to different area networks respectively have tunnel switching ability through the switching node, wherein the switching node comprises a node of a Border Gateway Protocol-based route reflector;

setting routing and forwarding information at the switching node for tunnel switching between the end-to-end Multi-Protocol Label Switching Traffic Engineering tunnels within different area networks; and switching and transferring, by the switching node, a message in the end-to-end Multi-Protocol Label Switching Traffic Engineering tunnels according to the routing and forwarding information;

wherein setting routing and forwarding information comprises:

receiving a Border Gateway Protocol-based routing message by the switching node; and modifying a Virtual Private Network (VPN) label, a MPLS TE tunnel label and the next hop node in a corresponding routing and forwarding entry in the routing and forwarding information, and modifying the VPN label, the MPLE TE tunnel label and the next hop node in the Border Gateway Protocol-based routing message by the Border Gateway Protocol-based route reflector according to the information contained in the routing message, and distributing the modified routing message, wherein the Border Gateway Protocol-based routing message is used as control signaling for carrying Multi-Protocol Label Switching VPN routing information.

2. The method as in claim 1, wherein the Multi-Protocol Label Switching Traffic Engineering tunnels include Multi-Protocol Label Switching Traffic Engineering tunnels based on Multi-Protocol Label Switching VPN.

3. The method as in claim 1, wherein the step of partitioning a network into multiple area networks comprises partitioning the network into multiple Access Networks and a Core Network.

4. A system for transferring a message based on Multi-Protocol Label Switching Traffic Engineering (MPLS TE) tunnels, the system comprising:
   at least two area network, wherein end-to-end Multi-Protocol Label Switching Traffic Engineering tunnels between the nodes art set within each area network, and the end-to-end Multi-Protocol Label Switching Traffic Engineering tunnels within each area network are in a fully-mesh state;
   a switching node at which tunnel switching between the end-to-end Multi-Protocol Label Switching Traffic Engineering tunnels within different area networks is needed, wherein end-to-end Multi-Protocol Label Switching Traffic Engineering tunnels belonging to different area networks respectively have tunnel switching ability through the switching node; wherein the switching node comprises a node of a Border Gateway Protocol-based route reflector;
   the router reflector is configured to:
      receive a Border Gateway Protocol-based routing message by the switching node; and
   modify a Virtual Private Network (VPN) label, a MPLS TE tunnel label and the next hop node in a corresponding routing and forwarding entry in the routing and forwarding information, and modifying the VPN label, the MPLE TE tunnel label and the next hop node in the Border Gateway Protocol-based routing message by the Border Gateway Protocol-based route reflector according to the information contained in the routing message, and distributing the modified routing message, wherein the Border Gateway Protocol-based routing message is used as control signaling for carrying Multi-Protocol Label Switching VPN routing information; and
   switch and transfer a message in the end-to-end Multi-Protocol Label Switching Traffic Engineering tunnels according to the routing and forwarding information.

\* \* \* \* \*